Sept. 3, 1957     O. S. WILLIAMS     2,804,930
IMPLEMENT FRAME ATTACHED TRACTOR CAB
Filed May 14, 1954     2 Sheets-Sheet 1
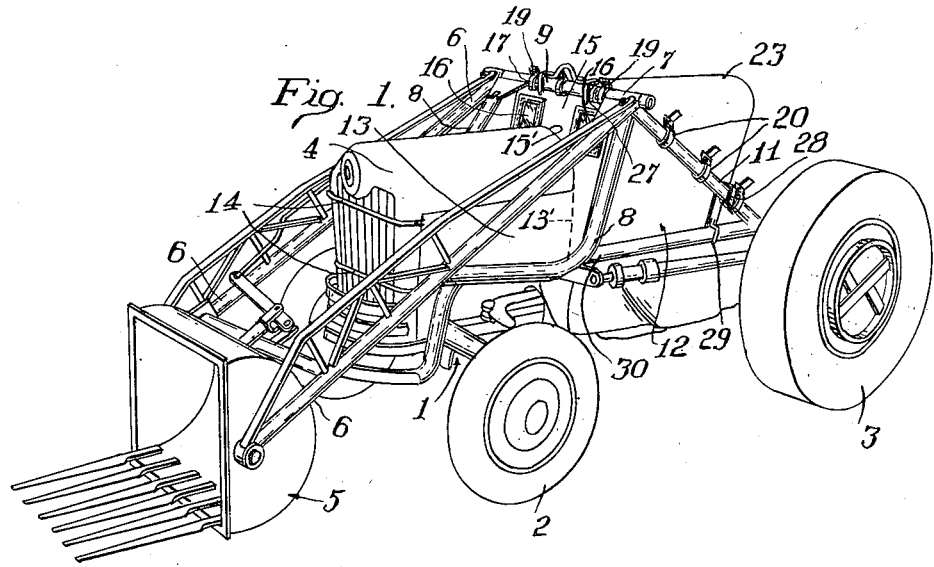
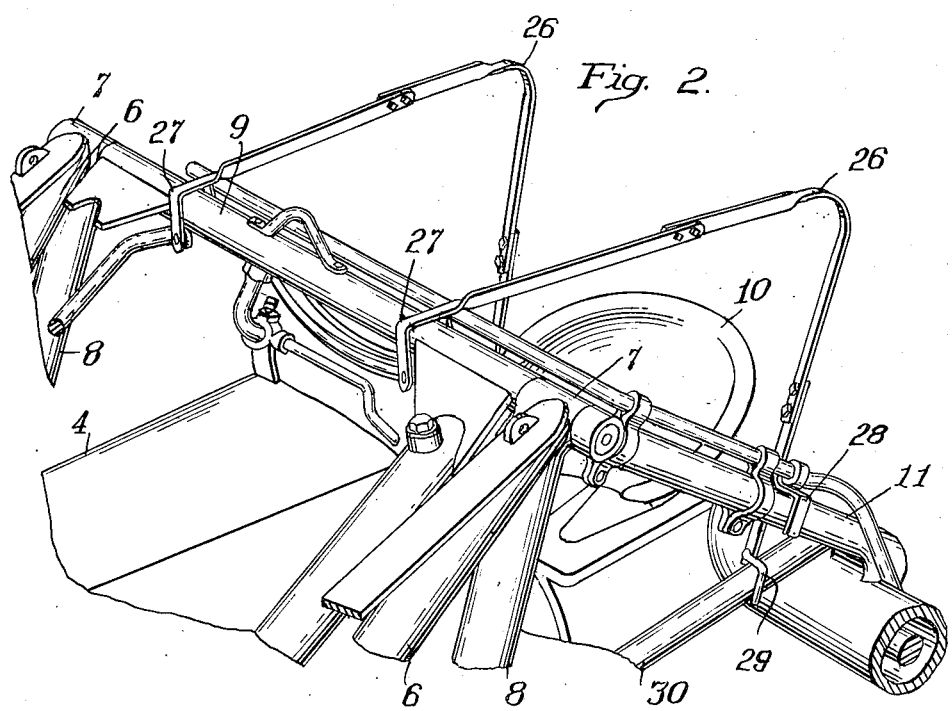
INVENTOR
Oscar Stanley Williams
BY
ATTORNEY

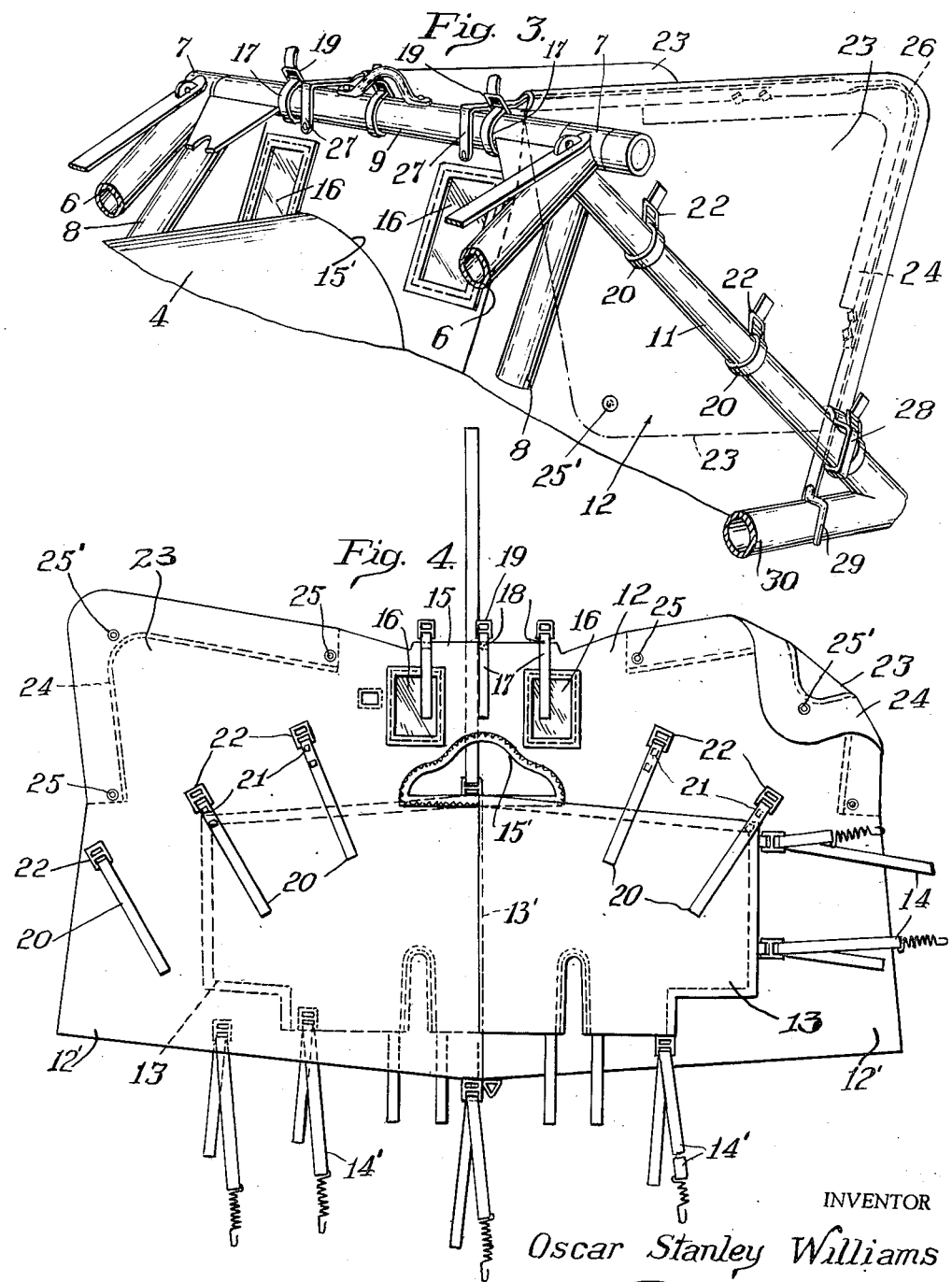

United States Patent Office 2,804,930
Patented Sept. 3, 1957

2,804,930

IMPLEMENT FRAME ATTACHED TRACTOR CAB

Oscar Stanley Williams, Arlington, Ind.

Application May 14, 1954, Serial No. 429,809

7 Claims. (Cl. 180—54)

This invention relates to improvements in tractor cabs and more particularly to enclosures adapted to be applied to an operator's seat portion of a tractor, both to protect the operator from the wind and to direct heat from the engine to the region of the operator.

Various forms of tractor cabs have been proposed and used heretofore, as applied to conventional farm tractors. Such devices may be applied readily when the tractor does not have implements attached thereto, but difficulties have been encountered in the provision of such tractor cabs where some form of attachment has been secured to the tractor, such, for example, as a loader. The frame structure and operating mechanism of an implement of the loader type interferes with the normal positioning of the tractor cab frame and the application of the covering material to the tractor.

One object of this invention is to overcome the objections encountered heretofore and to adapt a tractor cab for use on a tractor that has an implement of the loader type attached thereto.

Another object of the invention is to improve the construction of the tractor cab to enable this to be applied readily and conveniently to an implement frame attached to the tractor, such, for example, as a loader frame, so as to provide the advantages of a tractor enclosure in such case, both to deflect the wind from the operator and to apply heat thereto, when desired.

Still another object of the invention is to provide frame structure and a cover construction which may be adapted to be held in place by a loader frame of a tractor and yet be readily removable therefrom or partially disconnected therefrom when it is desired to reduce the heat effect obtained thereby, and which will not interfere with the normal operation of the loader construction.

These objects may be accomplished according to one embodiment of the invention by providing separate frame members secured at opposite sides of the operator's seat on the tractor and held in place detachably on the loader frame of the conventional farm tractor. Provision is made for detachable connection of opposite sides of a flexible or canvas cab structure to such frame members so as to retain these members in place, and yet to permit of folding of portions of the cover material down out of the way when its full protective advantages are not required. The implement frame itself is utilized to facilitate the holding of the covering material in place, with side wings thereon that are retained by these frame members.

This embodiment of the invention is illustrated in the accompanying drawings, in which:

Fig. 1 is a perspective view of a farm tractor and loader, showing a tractor cab applied thereto, according to this invention;

Fig. 2 is a perspective view of a portion of the tractor and frame members for the side wings;

Fig. 3 is a similar view, showing the side wings in place thereon; and

Fig. 4 is a plan view of the covering material for the tractor cab detached and with both the cowl portion and side wings flattened out or extended, and with the side flaps interfolded with respect to the depending side portions of the cowl portion.

The invention is shown as applied to a farm tractor of conventional form, generaly designated by the numeral 1, having front and back wheels 2 and 3 and a power unit that includes an engine, generally indicated at 4. The top of the engine is shaped in the form of a hood usually, and may include a gasolene tank extending thereover, according to conventional embodiments of farm tractors. These constructions, however, as well as the frame structure of the tractor, form no part of this invention and the tractor cab may be applied to any conventional form thereof, as desired.

An implement of the loader type is indicated generally at 5. This is described as an example of various implement attachments that may be applied to the tractor 1 while using the tractor cab of this invention in connection therewith. The loader 5 is supported by a pair of arms 6 pivotally connected with opposite sides thereof, and which arms are pivotally supported at 7 on an implement frame that is mounted on the tractor 1, the main supporting portion of which is indicated generally at 8. The supporting frame also includes a cross bar 9 that extends transversely in front of the operator, who is normally located at an operator's station, as on a seat 10 on the tractor, and which frame cross bar 9 extends over the engine or power unit, generaly indicated at 4. A frame member 11 extends downwardly and rearwardly from each opposite end of the cross bar 9 to a secure connection on the floor or rear axle housing of the tractor. This frame structure of the loader attachment is described merely as an example and it will be evident that the invention may be applied to any suitable implement construction, as customarily provided, not being limited to the type of implement or frame structure thereof as described and illustrated. The operating means for the loader 5 is not illustrated and described in detail, as any conventional operating means may be used, since the manner in which the loader is manipulated does not form a part of this invention.

The body of the tractor cab is indicated generally at 12, being formed of suitable covering material to provide an enclosure about the portion of the tractor at the operator's station in the region of the operator's seat 10. It has been customary heretofore to make tractor cabs of this general type of heavy canvas, duck or other flexible fabric, although it is appreciated that other materials may be used for this purpose, including thin transparent plastic that may be shaped and fitted, as desired, to the surrounding portion of the tractor. A thin transparent plastic material is sufficiently light in weight and yet strong in texture so as to require little framing or support, apart from that which will be provided on the tractor and/or implement to which it may be connected.

The body of the covering material 12 is shaped to provide a cowl portion 15 to fit over the rear portion of the power unit or engine 4, and about the operator's compartment provided by and adjacent to the seat 10, and may have side flaps, if desired, indicated generally at 13, that extend along opposite sides of the engine 4 for the purpose of enclosing these opposite sides and directing heat back from the engine through the opening provided between the latter and the operator's compartment within the body of the cab, generally indicated at 12.

Suitable means may be used for retaining the side flaps 13 in place, such, for instance, as tie connections 14 around the radiator or front portion of the power unit, and additional tie connections 14' may be provided between the opposite flaps 13 beneath the power unit, if desired. The bottom portion of the unit may be open or closed as desired. Usually it is not necessary to form an enclosure therefor.

The body of the covering material includes a section that extends transversely over the top of the power unit or hood thereof, in front of the operator when located on the seat 10, to provide a cowl section, generally indicated at 15. This cowl section 15 may be provided with windows therein, as indicated at 16, to insure full visibility, not only for steering the tractor, but also for manipulation of implements attached thereto. The lower edge 15' of the cowl section 15 is shaped to conform substantially snugly to the hood portion of the power unit 4, to be drawn tightly thereover and down along the sides thereof, which depending sides are indicated at 12'. Each of the depending sides 12' is joined at one edge thereof to an adjacent rear edge 13' of the side flap 13.

The body of the covering material is illustrated in Fig. 4 as flattened out and with the side wings 23 and depending side portions 12' of the cowl section 12 stretched lengthwise substantially in flattened relation. The side flap 13 on one of the depending cowl portions 12' extends in overlapping relation with the other depending cowl portion 12' at the right in Fig. 4, while the side wing 13 on the last-mentioned depending cowl portion 12' underlies the first-mentioned cowl portion 12'. This overlapped relation allows the entire body to assume substantially a flattened condition, as illustrated in Fig. 4.

The upper edge of this section 15 is shown as provided with a plurality of straps 17 stitched thereto at 18 and having buckles 19 thereon for cooperation with the straps to provide detachable connections for encircling the cross bar 9 thereby, to secure the cowl section 15 to said cross bar at one or more points along the length of the cowl section, as will be apparent from Figs. 1 and 3.

The opposite depending sides 12' of the body 12 are held in place by the frame rods 11 that extend downward to the floor or frame of the tractor, as described above. Detachable connections are provided for securing the opposite sides 12' of the body 12 to the frame rods 11, as, for instance, by straps 20 which are stitched at 21 to the body 12. Buckles are shown at 22 connected with the straps 20 so as to cooperate with the straps for securing the latter around the frame rods 11, as illustrated in Figs. 1 and 3.

The body 12 of the cab is provided with extended portions on opposite sides thereof, forming side wings 23 that are adapted to extend back on opposite sides of the operator to afford additional protection for the operator when desired. These side wings 23 are formed in one integral piece with the body 12 and should be supported in upstanding relation on opposite sides of the operator when located on the seat 10. At the same time, it is desirable that the side wings 23 may be folded down to the positions indicated by dot and dash lines in Fig. 3 so as to leave the sides open above the diagonal frame rods 11, the folding being about diagonal lines that extend downward along the rods 11 adjacent the points of connection 21 of the straps 20 with the body 12, so that substantially the entire wings 23 will thus be folded inward and downward. Coacting snap fasteners 25' on the wings and on the body 12 secure the wings 23 in folded position.

To provide support for each of the wings 23, a detachable frame member is provided, which has provision for detachable connection with the wing along its upper and rearward edge. Such a connection may be provided by open-ended pockets, generally indicated at 24, extending along the outer edge and along the top of each wing 23 in continuous open relation, forming an angular passageway therealong. While such pockets could be provided by an additional strip or strips of material secured to the surface of each wing 23, I have shown the pockets as formed by an inward fold of material along the edges mentioned, which pockets are held partially closed along their inner edges by snap fasteners 25, between the inward fold or side portion of the pocket and the body material of the side wing 23, at the ends of the pocket.

Supporting arms are provided for the respective wings, generally designated at 26, one on each opposite side of the operator's station on the seat 10. The supporting arms 26 are shown in the form of bows of curved or angular construction, made of relatively thin strip steel, having, nevertheless, sufficient rigidity to support the wings 23 in upstanding secure relation. These supporting arms 26 extend through the pockets 24, being retained in place thereby and enclosed by the snap fasteners 25. Each of the supporting arms 26 may be made in one piece or fabricated for securing the parts together and to the implement frame.

At one end, each supporting arm 26 is adapted to be connected with the cross bar 9 of the implement frame for holding the arm 26 and the adjacent side wing 23 in place in proper upstanding relation and yet to permit ready disconnection of the arm from the cross bar 9 when desired. It is preferred to use a U-shaped yoke 27 rigidly secured to the arm 26 at one end thereof so as to be hooked over the cross bar 9 in embracing relation with the latter and resting on the cross bar by gravity, while yet retaining the supporting arm 26 against endwise displacement in either direction transversely of the cross bar.

The opposite end of each supporting arm 26 is provided with a pair of L-shaped hooks 28 and 29 extending laterally from the bar of the supporting arm. The hook 28 is adapted to extend across and partially around the diagonal frame member 11 and to be seated thereon, while the hook 29 extends partially around and is seated on a frame member 30 that is connected with the member 11 and extends horizontally therefrom. This gives two points of anchorage for the lower end of the supporting arm 26 that will serve to hold the arm securely in place on the frame and yet permit of ready detachment of the arm therefrom. Fastening devices are not required for securing the hooks 28 and 29 or the yoke 27 in place on the frame. These will be retained effectively by the hook connections described and will serve to support the covering material in proper relation to the tractor, substantially as shown and described.

The body 12 can be applied to the tractor generally in the conventional manner of shaping it over the top and along the sides of the power unit or engine 4, with or without the heat flaps 13. If the latter are used, they are secured by fastenings provided, such as may be indicated at 14. The cowl section 15 of the tractor cab will be secured to the cross arm 9 by the strap fastening devices, generally indicated at 17—19, thus effectively holding the body portion in place on the frame of the implement. The strap fastening devices 20—22 will be secured to the diagonal braces 11 in embracing relation with the latter, as will be apparent from Figs. 1 and 3 of the drawings.

If the side wings 23 are not required by the operator, they may be tucked down inside the tractor cab and secured by the snap fasteners 25', as indicated by dot and dash lines in Fig. 3. In that event, the supporting arms 26 will not be in place as they can be removed also. However, when the side wings 23 are desired for added protection along the sides, these may be raised to the full line positions in the drawings and held in place by the arms 26.

Each wing 23 may be lifted to its upright position and the snap fasteners 25 disconnected, thus leaving the pockets 24 open along their inner edges, as well as at the ends. Each supporting arm 26 can be set into place, first by engaging the hooks 28 and 29 with the frame members 11 and 30 of the implement, after which the upper part of the arm 26 is swung forward in counterclockwise direction, as viewed in Fig. 2, until the yoke 27 is engaged over the cross bar 9. This will serve to retain the supporting arm 26 in place on the implement frame without requiring fastening devices, such as screws, bolts, or the like. The arm 26 will be placed at the inner side of the wing 23; and with the pocket 24 open, the latter may be lifted over the supporting arm 26 and around the latter so as to enclose the supporting arm in the pocket between the closed edge thereof and the snap fasteners 25, whereby upon engagement of the snap fasteners 25, the supporting arm 26 will be retained in the pocket throughout the length of the latter. This arm will then support the side wing 23 in upstanding relation along its upper and rearward edges.

When it is desired to fold the wings 23 downward to the dotted line positions shown in Fig. 3, the pockets 24 can be opened by releasing the snap fasteners 25, after which the side wings can be separated from the arms 26, permitting disengagement of the latter from the implement frame, as viewed in Fig. 2. Then the fabric of the wings 23 can be folded downward, as shown, thus allowing more ventilation along the opposite sides of the operator. The folded-down wings will be held in place by the snap fasteners 25'.

This construction makes it possible to provide a tractor cab or enclosure for a tractor having a power implement applied thereto, such, for example, as a loader, without interfering with the operation of the latter. No separate mounting frame for the tractor cab is required, inasmuch as the cab is mounted on and retained in place by the tractor frame itself and the implement frame. Side wings can be provided for additional protection without interfering unduly with the construction, and with very simple supporting arms that can be attached to the implement frame readily, as by detachable fastenings at opposite ends of the arms and ready separation of the latter from the side wings on the tractor cab.

While the invention has been illustrated and described in one embodiment, it is recognized that variations and changes may be made therein without departing from the invention as set forth in the claims.

I claim:

1. A tractor cab adapted for use with a tractor having an engine and an operator's seat in open communication with the engine, and an implement frame mounted on the tractor including a pair of side members and a cross bar, said cab comprising a deflector portion having side portions adapted to embrace opposite sides of the engine with a cowl portion connecting said side portions together and adapted to extend over the engine, side wings connected with said side portions, each of the side wings having pockets extending along the outer edges thereof, frame members extending through the pockets and detachably supporting the side wings, and means for mounting each of the frame members at opposite ends on the side frame member and cross bar of the implement frame.

2. A tractor cab adapted for use with a tractor having an engine and an operator's seat in open communication with the engine, and an implement frame mounted on the tractor including a pair of side members and a cross bar, said cab comprising a deflector portion having side portions adapted to embrace opposite sides of the engine with a cowl portion connecting said side portions together and adapted to extend over the engine, side wings connected with said side portions, each of the side wings having open-ended pockets extending along the edges thereof, frame members extending through the pockets from end to end thereof, and mounting brackets connected with opposite ends of each frame member for detachable connection with the side frame member and cross bar of the implement frame for detachable mounting of the frame member thereon.

3. A tractor cab adapted for use with a tractor having an engine and an operator's seat in open communication with the engine, and an implement frame mounted on the tractor including a pair of side members and a cross bar, said cab comprising a deflector portion having side portions adapted to embrace opposite sides of the engine with a cowl portion connecting said side portions together and adapted to extend over the engine, side wings connected with said side portions, each of the side wings having pockets extending along the outer edges thereof, frame members extending through the pockets and detachably supporting the side wings, means for mounting each of the frame members at opposite ends on the side frame member and cross bar of the implement frame, and means for opening the inner edges of the pockets and disengagement thereof from the frame members for downward folding of the side wings upon themselves separate from the frame members.

4. The combination with a tractor having an engine and an operator's seat in open communication with the engine and an implement frame mounted on the tractor including a pair of side frame members and a cross bar, of a cab comprising a deflector body having side portions arranged to embrace opposite sides of the engine with a cowl connecting said side portions together and adapted to extend over the engine, means for detachably connecting the side portions and the cowl portion to the side frame members and cross bar, respectively, for supporting the cab thereon, side wings connected with said side portions and extending upwardly on opposite sides of the operator's seat, each of the side wings having open-ended pockets extending along the edges thereof, frame members extending through said pockets from end to end thereof, bracket hooks connected with opposite ends of the frame members and detachably engaging the side frame members and cross bar of the implement frame for detachable mounting of the frame members thereon, said pockets having means for disconnection of the lower edges thereof from the frame members for removing the side wings therefrom and for folding the wings downwardly upon the side portions.

5. A tractor cab adapted for use with a tractor having a power unit and an operator's station and having an implement frame mounted on the tractor including a pair of diagonal side members and a cross bar, said cab comprising a cowl portion adapted to extend over the power unit at the front of the operator's station, side wings connected with opposite sides of the cowl portion arranged to extend on opposite sides of the operator's station beside the diagonal side members of the implement frame, means extending substantially diagonally across the side wings for securing the side wings to the side members, and means for supporting the upper edges of the side wings on the implement frame.

6. A tractor cab adapted for use with a tractor having a power unit and an operator's station and having an implement frame mounted on the tractor including a pair of diagonal side members and a cross bar, said cab comprising a cowl portion adapted to extend over the power unit at the front of the operator's station beside the diagonal side members of the implement frame, side wings connected with opposite sides of the cowl portion arranged to extend on opposite sides of the operator's station beside the diagonal side members of the implement frame, means extending substantially diagonally across the side wings for securing the side wings to the side members, supporting members detachably connected with the upper edges of the side wings, and means forming yokes at opposite ends of the supporting members for detachable engagement with the cross member and implement frame to hold the yokes thereon.

7. A tractor cab adapted for use with a tractor having a power unit and an operator's station and having an implement frame mounted on the tractor including a pair of diagonal side members and a cross bar, said cab comprising a cowl portion adapted to extend over the power unit at the front of the operator's station, side wings connected with opposite sides of the cowl portion arranged to extend on opposite sides of the operator's station beside the diagonal side members of the implement frame, means extending substantially diagonally across the side wings for securing the side wings to the side members, means for supporting the upper edges of the side wings on the implement frame and for detachment therefrom for folding downward about said diagonal securing means, and means for detachably securing the upper edge portions of the side wings to the lower portions thereof after folding downward.

References Cited in the file of this patent

UNITED STATES PATENTS

| | | |
|---|---|---|
| 2,452,834 | Clapper | Nov. 2, 1948 |
| 2,461,974 | Flora | Feb. 15, 1949 |
| 2,566,572 | Lindsey | Sept. 4, 1951 |
| 2,631,057 | Weaklend | Mar. 10, 1953 |

FOREIGN PATENTS

| | | |
|---|---|---|
| 825,489 | Germany | Dec. 20, 1951 |